(12) United States Patent
Chen

(10) Patent No.: US 10,665,187 B2
(45) Date of Patent: May 26, 2020

(54) GOA CIRCUIT AND DISPLAY PANEL AND DISPLAY DEVICE INCLUDING THE SAME

(71) Applicant: SHENZHEN CHINA STAR OPTOELECTRONICS TECHNOLOGY CO., LTD., Shenzhen, Guangdong (CN)

(72) Inventor: Shuai Chen, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/322,074

(22) PCT Filed: Sep. 13, 2018

(86) PCT No.: PCT/CN2018/105491
§ 371 (c)(1),
(2) Date: Jan. 31, 2019

(87) PCT Pub. No.: WO2020/015111
PCT Pub. Date: Jan. 23, 2020

(65) Prior Publication Data
US 2020/0027415 A1    Jan. 23, 2020

(30) Foreign Application Priority Data
Jul. 20, 2018 (CN) .......................... 2018 1 0805691

(51) Int. Cl.
*G09G 3/36* (2006.01)
*G06F 1/10* (2006.01)

(52) U.S. Cl.
CPC ............. *G09G 3/3648* (2013.01); *G06F 1/10* (2013.01); *G09G 2300/0809* (2013.01); *G09G 2310/08* (2013.01)

(58) Field of Classification Search
CPC ......... G09G 3/3648; G09G 2300/0809; G09G 2310/08; G06F 1/10
See application file for complete search history.

(56) References Cited

U.S. PATENT DOCUMENTS 9,659,540 B1*  5/2017  Mei ...................... G09G 3/3648
2016/0284296 A1*  9/2016  Dai ........................ G09G 3/36
(Continued)

*Primary Examiner* — Peter D McLoone
(74) *Attorney, Agent, or Firm* — Maschoff Brennan

(57) ABSTRACT

A GOA circuit is GOA circuits of multiple levels. The GOA circuit of each level includes a signal downward transmission unit, a pull-down unit and a pull-down maintaining unit, and the pull-down maintaining unit includes a pull-down maintaining transistor, a pull-down maintaining capacitor and a second pull-down maintaining transistor. A gate of the pull-down maintaining transistor is connected to an output end of a lower-level signal downward transmission unit, a source and a drain are respectively connected to a lower-level scan signal output end and a pull-down maintaining signal output end, the pull-down maintaining capacitor is connected between the drain of the first pull-down maintaining transistor and a first voltage input end, a gate of the second pull-down maintaining transistor is connected to an upper-level first node, and a source and a drain are respectively connected to the pull-down maintaining signal output end and the first voltage input end.

15 Claims, 3 Drawing Sheets

(56) References Cited

U.S. PATENT DOCUMENTS

| | | | |
|---|---|---|---|
| 2017/0169778 A1* | 6/2017 | Mei | G09G 3/3648 |
| 2019/0019471 A1* | 1/2019 | Zeng | G02F 1/1368 |
| 2019/0096348 A1* | 3/2019 | Xu | G09G 3/3677 |
| 2019/0285930 A1* | 9/2019 | Chen | G02F 1/13454 |
| 2019/0385556 A1* | 12/2019 | Guan | G09G 3/3648 |
| 2020/0033653 A1* | 1/2020 | Chen | G09G 3/3648 |
| 2020/0033654 A1* | 1/2020 | Chen | G02F 1/1343 |
| 2020/0035137 A1* | 1/2020 | Chen | G09G 3/20 |
| 2020/0035180 A1* | 1/2020 | Chen | G09G 3/3677 |
| 2020/0043429 A1* | 2/2020 | Xu | G02F 1/13306 |
| 2020/0082776 A1* | 3/2020 | Shi | G09G 3/3677 |

\* cited by examiner

GOA CIRCUIT AND DISPLAY PANEL AND DISPLAY DEVICE INCLUDING THE SAME

TECHNICAL FIELD

The present invention relates to a display technical field, and more particularly, to a pull-down maintaining unit that may be applied to a GOA circuit.

BACKGROUND ART

With the evolution of photoelectricity and semiconductor techniques, vigorous development is also brought to a display panel field. In the existing display field, commonly seen displays are a liquid crystal display, an organic light emitting diode display, and the like. In current active display panels, a driving signal from a driving circuit outside a display panel is utilized to drive a chip on the display panel so as to display an image. Recently, in order to narrow a frame of a display panel, it gradually develops into directly manufacturing a driving circuit on the display panel, such as, integrating a gate driving circuit on a substrate to form scanning of the display panel by using a Gate Drive on Array (GOA for short).

Compared with a conventional COF (Chip On Film) technique, a GOA technique may not only reduce manufacturing costs significantly but also be highly advantageous to improving product capacity for omitting manufacturing procedure of bonding of the COF at a Gate side, moreover, it may make the display panel be more suitable for manufacturing a narrow-frame or frameless display products. Therefore, the GOA technique is a key technique in future development of display panels.

FIG. 1 illustrates a schematic circuit diagram of a single-level GOA circuit in the prior art. A GOA circuit usually includes a plurality of single-level GOA circuits that are cascaded, and the GOA circuit of each level drives a horizontal scanning line of a level correspondingly. As illustrated in FIG. 1, a single-level GOA circuit 100 includes a pull-up control unit 110, a pull-up unit 120, a signal downward transmission unit 130, a pull-down unit 140, a pull-down maintaining unit 150 and a bootstrap unit 160, wherein the pull-up control unit 110 takes charge of precharging a first node Q(N), the pull-up unit 120 is mainly for increasing a potential of a scan signal output end G(N) so as to control the turning on of a transistor of the pull-down unit of an upper-level GOA circuit, the signal downward transmission unit 130 is mainly for controlling transmission and cutoff of a scan signal in the pull-up control unit 110 of a lower-level GOA circuit, the pull-down unit 140 takes charge of pulling down a potential of the first node Q(N) and a potential of the scan signal output end G(N) to a potential of a first voltage input end VSS at a first time, the pull-down maintaining unit 150 takes charge of maintaining the potential of the first node Q(N) and the potential of the scan signal output end G(N) to be the potential of the first voltage input end VSS unchanged, and the bootstrap unit 160 takes charge of increasing the potential of the first node Q(N); in this way, it is conducive to an output of the potential of the scan signal output end G(N) of the pull-up unit 120. The potential of the first voltage input end VSS may be a low potential, for example, may be a ground voltage.

An electronic element in the pull-down maintaining unit 150 illustrated in FIG. 1 is actually an inverter of a Darlington structure, and a specific circuit thereof is as illustrated in FIG. 2. FIG. 2 illustrates a schematic circuit diagram of an inverter of a Darlington structure in the prior art. In the circuit diagram of the inverter of a Darlington structure, when a low level signal is input at the first voltage input end VSS, a high level signal is input at a pull-down signal input end LC. When a high level signal is input at an inverter input end Input, a low level signal is output at an inverter output end Output. In contrary, when a low level signal is input at the inverter input end Input, a high level signal is output at the inverter output end Output.

In the prior art, a single-level GOA circuit is basically to place the above several parts in a GOA circuit of a same level, thus, the single-level GOA circuit in FIG. 1 may be converted into a single-level GOA circuit illustrated in FIG. 3. FIG. 3 illustrates another schematic circuit diagram of a single-level GOA circuit in the prior art. In FIG. 3, CK/XCK denotes a clock signal input end, ST(N) denotes a level transmission signal output end, G(N) denotes a scan signal output end, and Q(N) denotes a first node. A high level signal may be input at the pull-down signal input end LC, a low level signal may be input at the first voltage input end VSS, and a potential of the first node Q(N) may be an alternating current potential.

When the potential of the first node Q(N) is a low potential, a second transistor T52 and a fourth transistor T54 are turned off, a first transistor T51 is turned on, and then a third transistor T53 is turned on, and a potential of point B is a high potential. When the potential of the first node Q(N) is a high potential, the second transistor T52 is turned on, and the first transistor T51 is turned on, at this time, a potential of point A is in a certain intermediate potential for being subject to mutual pulling between a high potential of the pull-down signal input end LC and a low potential of the first voltage input end VSS, the third transistor T53 is in a semi-turned-on state, and the fourth transistor T54 is in a turned-on state. Therefore, a potential of point B is not possible to satisfy requirements of an absolute low potential for also being subject to mutual pulling between a potential of the pull-down signal input end LC and a potential of the first voltage input end VSS.

SUMMARY

Exemplary embodiments of the present invention lie in providing a new pull-down maintaining unit applied to a GOA circuit, and in a single-level GOA circuit, the same circuit function effect may be achieved in the case where the use of an inverter of a Darlington structure is avoided, which provides a new concept and thinking for GOA circuit designs, and saves a space occupied by the GOA circuit to a large extend, thereby providing new possibilities for designs of a narrow-frame display panel.

In exemplary embodiments of the present invention, a GOA circuit is provided, the GOA circuit is GOA circuits of multiple levels that are set by cascading, the GOA circuit of each level includes a pull-up control unit, a pull-up unit, a signal downward transmission unit, a pull-down unit, a pull-down maintaining unit, and a bootstrap unit, the GOA circuit of each level is disposed with a clock signal input end, a first node, a first voltage input end, a pull-down maintaining signal output end and a scan signal output end outputting to a horizontal scan line, the first node being on a connection line between the pull-up control unit and the bootstrap unit, wherein the pull-down unit includes a first pull-down maintaining transistor, a pull-down maintaining capacitor and a second pull-down maintaining transistor, a gate of the first pull-down maintaining transistor is connected to an output end of a lower-level signal downward transmission unit, a source and a drain are respectively connected to a lower-level scan signal output end and a pull-down maintaining signal output end, the pull-down maintaining capacitor is connected between the drain of the first pull-down maintaining transistor and the first voltage input end, a gate of the second pull-down maintaining transistor is connected to an upper-level first node, a source and a drain are respectively connected to the pull-down maintaining signal output end and the first voltage input end, and the pull-down unit pulls down a potential of the first node and a potential of the scan signal output end to a first voltage input to the first voltage input end based on a pull-down maintaining signal output from the pull-down maintaining signal output end.

In exemplary embodiments of the present invention, a low level signal is input at the first voltage input end, clock signals of GOA circuits of two adjacent levels input at the clock signal input end are complementary with each other.

In exemplary embodiments of the present invention, the pull-down unit includes a first pull-down transistor and a second pull-down transistor, a gate of the first pull-down transistor and a gate of the second pull-down transistor are connected to the pull-down maintaining signal output end, a source of the first pull-down transistor and a source of the second pull-down transistor are respectively connected to the scan signal output end and the first node, and a drain of the first pull-down transistor and a drain of the second pull-down transistor are connected to the first voltage input end.

In exemplary embodiments of the present invention, the pull-up control unit includes a pull-up control transistor, a gate of the pull-up control transistor is connected to an output end of an upper-level signal downward transmission unit, a source is connected to an upper-level scan signal output end, and a drain is connected to the first node.

In exemplary embodiments of the present invention, the pull-up unit includes a pull-up transistor, a gate of the pull-up transistor is connected to the first node, a source is connected to the clock signal input end, and a drain is connected to the scan signal output end.

In exemplary embodiments of the present invention, the signal downward transmission unit includes a signal downward transmission transistor, a gate of the signal downward transmission transistor is connected to the first node, a source is connected to the clock signal input end, and a drain is connected to the gate of the upper-level first pull-down maintaining transistor and the gate of the lower-level pull-up control transistor.

In exemplary embodiments of the present invention, the bootstrap unit includes a bootstrap capacitor, and two ends of the bootstrap capacitor are respectively connected with the first node and the scan signal output end.

In exemplary embodiments of the present invention, a display panel is provided, and the display panel may include the GOA circuit as mentioned above.

In exemplary embodiments of the present invention, a display device is provided, and the display device may include the display panel as mentioned above.

Other aspects and/or advantages in a general concept of the present invention will be partially illustrated in the following description, and the rest will be clarified through further description or may be learned through implementation of the general concept of the present invention.

BRIEF DESCRIPTION OF THE DRAWINGS

Figures are included so as to provide further understanding of the present invention, the figures are merged into the present description and constitute a part of the present description, the figures are taken as examples to illustrate embodiments of the present invention, and explain principles of the present invention along with depictions.

DETAILED DESCRIPTION OF EXEMPLARY EMBODIMENTS

Hereinafter, the present invention will be described in more details with reference to the figures in which embodiments of the present invention are illustrated. However, the present invention may be implemented in many different forms, and should not be construed as being limited to these embodiments explained here; these embodiments are provided so that the present invention is complete, and sufficiently convey the scope of the present invention to those skilled in the art. Various exemplary embodiments can be practiced by using one or more equivalent arrangements. In addition, same reference signs indicate same elements.

Although the terms "first" and "second" may be used here to describe various elements, components, regions, layers and/or portions, these elements, components, regions, layers and/or portions should not be limited by these terms. These terms are used to separate one element, component, region, layer and/or portion from another element, component, region, layer and/or portion. Thus, a first element, a first component, a first region, a first layer and/or a first portion as discussed below can be named as a second element, a second component, a second region, a second layer and/or a second portion without deviating from the teaching of the present invention.

Unless defined otherwise, all terms used here (including the technical terms and the scientific terms) have the same meanings as those generally understood by those skilled in the art. The terms (such as the terms defined in common dictionaries) should be interpreted as having a meaning that is consistent with their meaning in the context of the relevant field, while these terms should not be interpreted in an idealized or overly formal sense unless expressly so defined herein.

Moreover, the transistor in the present application may be a thin film transistor that includes a gate, a source and a drain. An N-type transistor is taken as an example to be described in the embodiments described below. However, the present invention is not limited to this. In other embodiments, the transistor in the present application may also be a P-type transistor, and when the transistor is a P-type transistor, a sequence diagram regarding a signal may be correspondingly amended. Furthermore, a source and a drain of the transistor in the present application may be exchanged.

Hereinafter, exemplary embodiments of the present invention will be described in details with reference to the figures.

Figure 1:
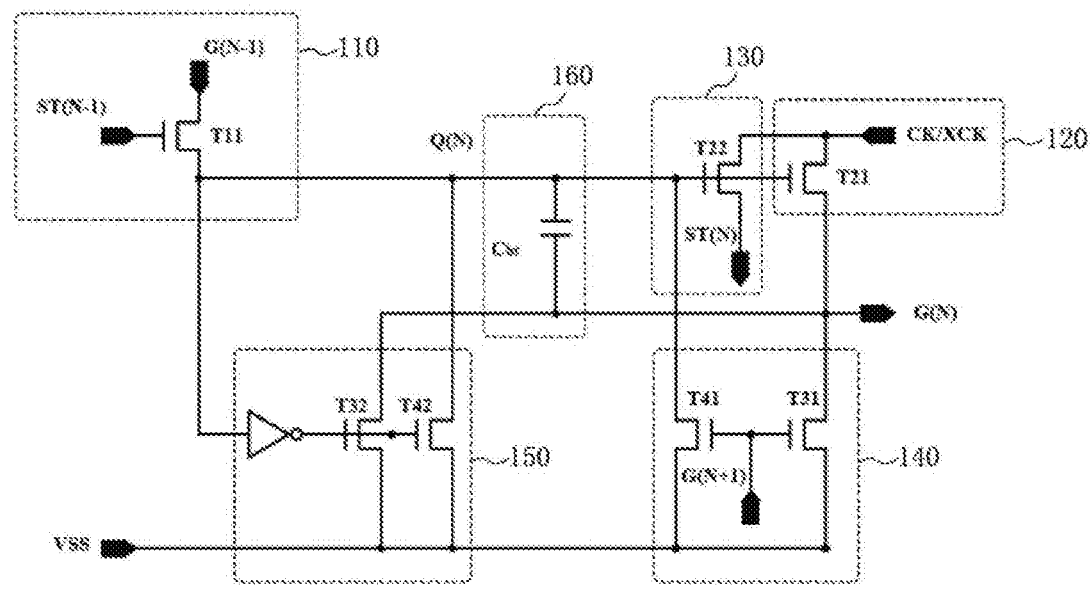
FIG. 1 illustrates a schematic circuit diagram of a single-level GOA circuit in the prior art.
Figure 2:
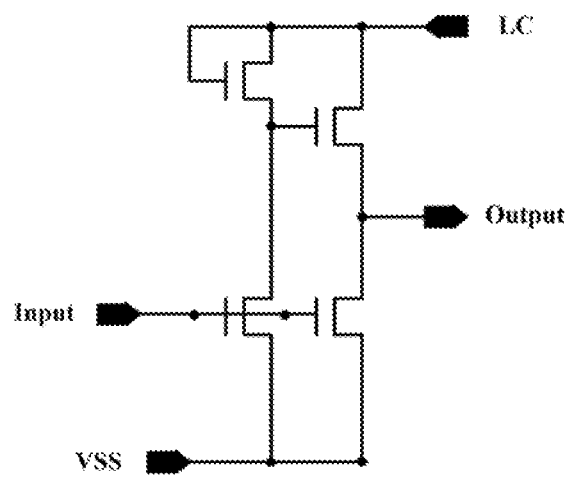
FIG. 2 illustrates a schematic circuit diagram of an inverter of a Darlington structure in the prior art.
Figure 3:
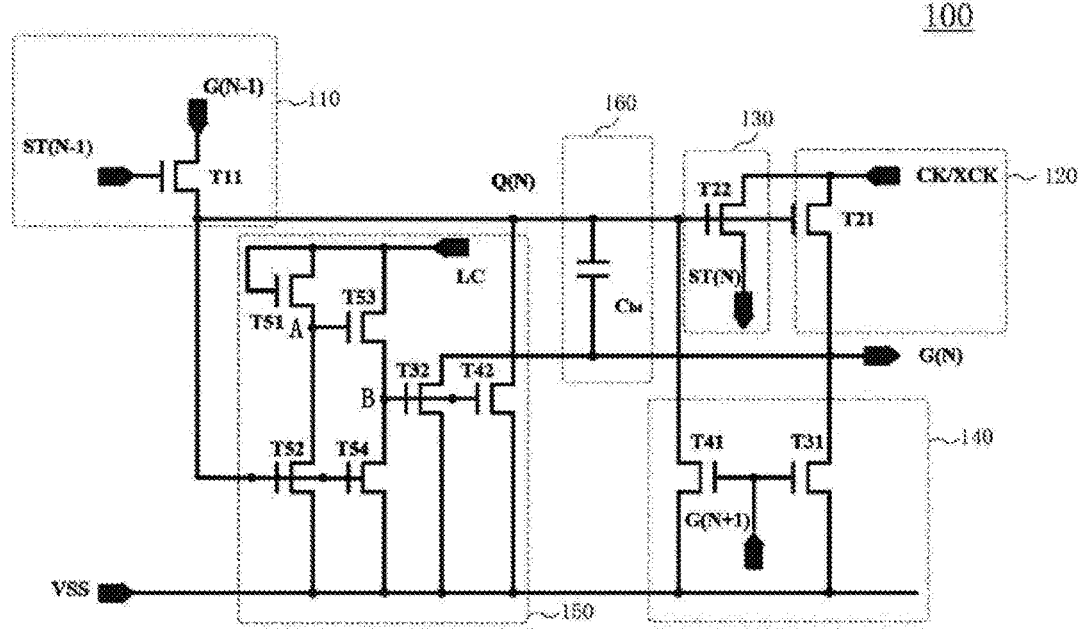
FIG. 3 illustrates another schematic circuit diagram of a single-level GOA circuit in the prior art.
Figure 4:
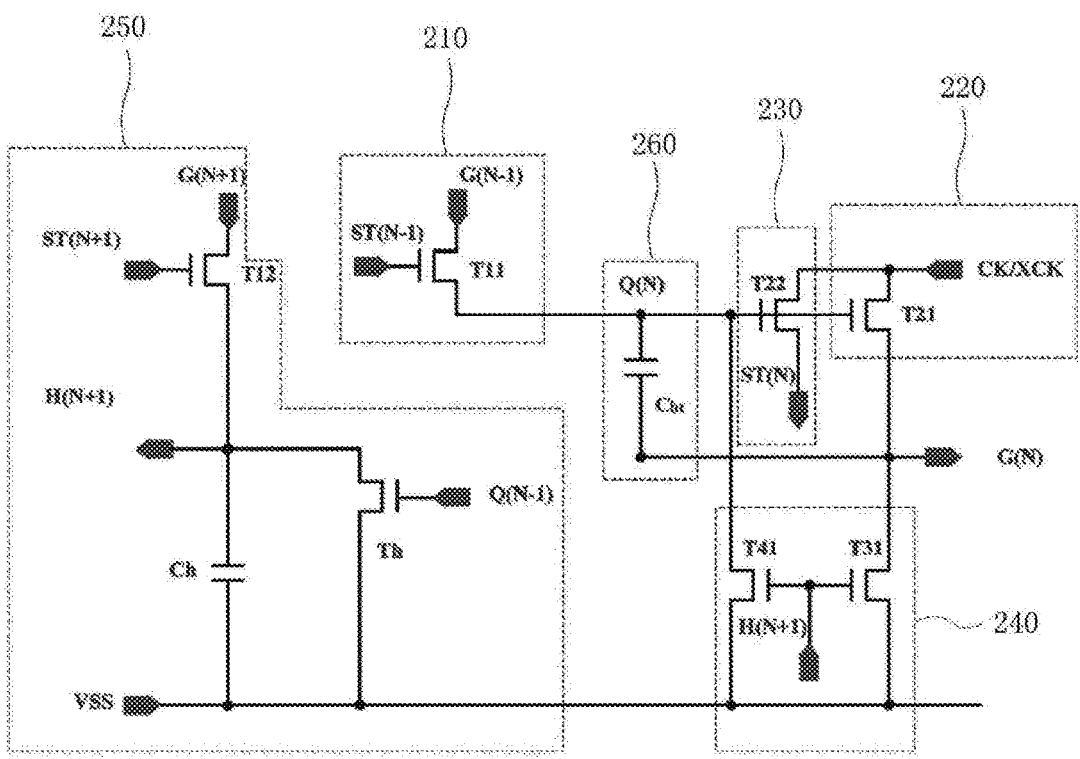
FIG. 4 illustrates a schematic circuit diagram of a single-level GOA circuit of exemplary embodiments of the present invention.

FIG. 4 illustrates a schematic circuit diagram of a single-level GOA circuit 200 of exemplary embodiments of the present invention. In exemplary embodiments of the present invention, a GOA circuit is provided, and is formed by a plurality of single-level GOA circuits 200 that are cascaded. In the descriptions below, an N$^{th}$-level GOA circuit is taken as an example, wherein N is an integer greater than zero. In the single-level GOA circuit 200 as illustrated in FIG. 4, a pull-up control unit 210, a pull-up unit 220, a signal downward transmission unit 230, a pull-down unit 240, a pull-down maintaining unit 250 and a bootstrap unit 260 are included.

The pull-up control unit 210 may include a pull-up control transistor T11, wherein a gate of the pull-up control transistor T11 may be connected to an upper-level level transmission signal output end ST(N−1), a source may be connected to an upper-level scan signal output end G(N−1), and a drain may be connected to a first node Q(N). Thus, the pull-up control transistor T11 may be turned on under the control of an upper-level level transmission signal and transmit an upper-level scan signal to the first node Q(N) so as to accomplish pre-charging on the first node Q(N).

The pull-up unit 220 may include a pull-up transistor T21. A gate of the pull-up transistor T21 may be connected to the first node Q(N), a source thereof may be connected to a clock signal input end CK/XCK, and a drain may be connected to a scan signal output end G(N). On the other hand, a drain of the pull-up transistor T21 may be connected to a source of the pull-up control transistor T11 of the lower-level pull-up control unit 210. Therefore, the pull-up transistor T21 may be turned on under the control of a signal of the first node Q(N), and then output a clock signal of the clock signal input end CK/XCK to the scan signal output end G(N) to increase a potential of a scan signal.

The signal downward transmission unit 230 may output a level transmission signal through the input clock signal under the control of a potential of the first node Q(N), and then control the turning on and off of a lower-level pull-up control transistor T11. The signal downward transmission unit 230 may include a signal downward transmission transistor T22. A gate of the signal downward transmission transistor T22 may be connected to the first node Q(N), a source thereof may be connected to the clock signal input end CK/XCK, and a drain thereof may be connected to a level transmission signal output end ST(N). Therefore, the signal downward transmission transistor T22 may be turned on under the control of a signal of the first node Q(N), and output the clock signal as a level transmission signal.

The pull-down unit 240 may pull down the potentials of the first node Q(N) and the scan signal output end G(N) to a first voltage under the control of a lower-level pull-down maintaining signal, and maintains voltages of the first node Q(N) and the scan signal at the first voltage. The pull-down unit 240 may include a first pull-down transistor T31 and a second pull-down transistor T41. A gate of the first pull-down transistor T31 and a gate of the second pull-down transistor T41 may be connected to a pull-down maintaining signal output end (it will be described below) H(N+1) of the pull-down maintaining unit 250 of the present-level GOA circuit 200, and a source and a drain of the first pull-down transistor T31 may be respectively connected to the scan signal output end G(N) and the first voltage input end VSS. A source and a drain of the second pull-down transistor T41 may be respectively connected to the first node Q(N) and the first voltage input end VSS. Thus, the first pull-down transistor T31 and the second pull-down transistor T41 may be turned on based on a pull-down maintaining signal output from the pull-down maintaining signal output end H(N+1) of the pull-down maintaining unit 250 of the present-level GOA circuit 200, pull down a potential of the first node Q(N) to the first voltage, and maintain the present-level scan signal at the first voltage. The potential of the first voltage input end VSS may be a low potential, for example, may be a ground voltage.

The pull-down maintaining unit 250 may include a first pull-down maintaining transistor T12, a pull-down maintaining capacitor Ch and a second pull-down maintaining transistor Th. The pull-down maintaining signal output end H(N+1) of the pull-down maintaining unit 250 of the present-level GOA circuit may be located between the first pull-down maintaining transistor T12 and the pull-down maintaining capacitor Ch, and the pull-down maintaining capacitor Ch and the second pull-down maintaining transistor Th are connected in parallel between the first pull-down maintaining transistor T12 and the first voltage input end VSS. In other words, the pull-down maintaining signal output end H(N+1) of the pull-down maintaining unit 250 of the present-level GOA circuit 200 may be located between the first pull-down maintaining transistor T12 and the second pull-down maintaining transistor Th.

A gate of the first pull-down maintaining transistor T12 may be connected to a level transmission signal output end ST(N+1) of the lower-level GOA circuit, and a source and a drain thereof may be respectively connected to a lower-level scan signal output end G(N+1) and the pull-down maintaining signal output end H(N+1) of the pull-down maintaining unit 250 of the present-level GOA circuit 200. A gate of the second pull-down maintaining transistor Th may be connected to a first node Q(N−1) of the upper-level GOA circuit, and a source and a drain thereof may be respectively connected to the pull-down maintaining signal output end H(N+1) of the pull-down maintaining unit 250 of the present-level GOA circuit 200 and the first voltage input end VSS. Two electrodes of the pull-down maintaining capacitor Ch may be respectively connected to the pull-down maintaining signal output end H(N+1) of the pull-down maintaining unit 250 of the present-level GOA circuit 200 and the first voltage input end VSS.

The bootstrap unit 260 may be coupled between the first node Q(N) and the scan signal output end G(N), and may increase and maintain the potential of the first node Q(N), and the bootstrap unit 260 may include a bootstrap capacitor Cbt. Two ends of the bootstrap capacitor Cbt are respectively connected with the first node Q(N) and the scan signal output end G(N).

Figure 5:
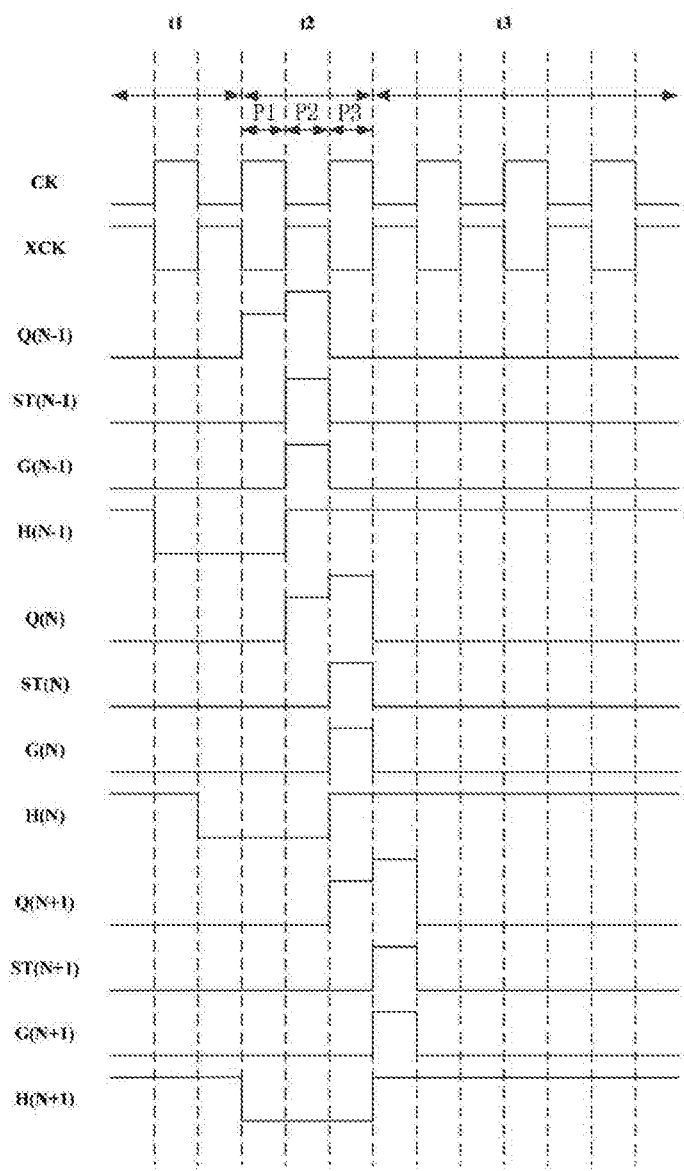
FIG. 5 illustrates a signal sequence diagram of a GOA circuit of exemplary embodiments of the present invention.

The pull-down maintaining unit 250 will be described in more details below in combination with contents illustrated in FIGS. 4 and 5. FIG. 5 illustrates a signal sequence diagram of a GOA circuit of exemplary embodiments of the present invention.

As illustrated in FIG. 5, in exemplary embodiments of the present invention, during a first period t1, a potential of the first node Q(N) and a potential of an upper-level first node Q(N−1) may both be a low potential, a pull-down maintaining signal of gates of the first pull-down transistor T31 and the second pull-down transistor T41 that controls a pull-down maintaining function of the first node Q(N) and the scan signal output end G(N) is a high potential, wherein the pull-down maintaining signal is a signal output at the pull-down maintaining signal output end H(N+1) of the pull-down maintaining unit 250 of the present-level GOA circuit 200. At this time, the pull-down maintaining unit works normally, and a potential of the first node Q(N) and a potential of the upper-level first node Q(N−1) may be continuously pulled down to the first voltage input by the first voltage input end VSS. During the first period t1, a level transmission signal of the upper-level level transmission signal output end ST(N−1) is in a low potential, and the first node Q(N) may be in a low potential.

A second period t2 may be a period in which a potential of the first node Q(N) or a potential of the upper-level first node Q(N−1) is a high potential. In exemplary embodiments of the present invention, a time period in which a potential of the upper-level first node Q(N−1) is a high potential while a potential of the first node Q(N) is a low potential may be referred to a first time period P1, a time period in which a potential of the upper-level first node Q(N−1) is a high potential and a potential of the first node Q(N) is a high potential may be referred to a second time period P2, and a time period in which a potential of the upper-level first node Q(N−1) is a low potential and a potential of the first node Q(N) is a high potential may be referred to a third time period P3. That is to say, the second period t2 may include the first time period P1, the second time period P2 and the third time period P3.

During the first time period P1 of the second period t2, a level transmission signal of a lower-level level transmission signal output end ST(N+1) is in a low potential, thus, the first pull-down maintaining transistor T12 of the pull-down maintaining unit 250 may be turned off; the second pull-down maintaining transistor Th may be turned on, therefore, a potential of the pull-down maintaining signal output end H(N+1) of the pull-down maintaining unit 250 of the present-level GOA circuit 200 may be pulled down to a low potential (i.e., the potential of the first voltage input end VSS); the level transmission signal of the upper-level level transmission signal output end ST(N−1) is in a low potential, and the potential of the first node Q(N) is a low potential. During the first time period P1, since the potential of the pull-down maintaining signal output end H(N+1) may be a low potential, the first pull-down transistor T31 and the second pull-down transistor T41 of the pull-down unit 240 may be turned off. In other words, during the first time period P1, the pull-down maintaining function of the pull-down maintaining unit 250 on the first node Q(N) and the scan signal output end G(N) may be relieved, thus, the potentials of the first node Q(N) and the scan signal output end G(N) are no longer affected by the potential of the first voltage input end VSS.

During the second time period P2, the potential of the upper-level first node Q(N−1) is a high potential and the potential of the first node Q(N) is a high potential, and the potential of the pull-down maintaining signal output end H(N+1) may be a low potential, thus, the first pull-down transistor T31 and the second pull-down transistor T41 may maintain a turned-off state. During the second time period P2, since the potential of the first node Q(N) is a high potential, the signal of the clock signal input end CK/XCK may be output as the level transmission signal of the level transmission signal output end ST(N) and the scan signal of the scan signal output end G(N). In particular, as illustrated in the sequence diagram of FIG. 5, the level transmission signal of the level transmission signal output end ST(N) and the scan signal of the scan signal output end G(N) may be identical with a signal of a clock signal input end CK, thus, a clock signal of a clock signal input end in an N$^{th}$-level GOA circuit illustrated in FIG. 4 should be a clock signal of the clock signal input end CK. Similarly, a clock signal of the clock signal input end in an N−1$^{th}$-level GOA circuit should be a clock signal of a clock signal input end XCK, and a clock signal of a clock signal input end in an N+1$^{th}$-level GOA circuit should be a clock signal of the clock signal input end XCK. At this time, during the second time period P2, the scan signal of the scan signal input end G(N) that is identical with the clock signal of the clock signal input end CK is in a low potential. Thus, during the second time period P2, the first node Q(N) is charged.

During the third time period P3, the pull-up control transistor T11 may be turned off, and the pull-up transistor T21 may be turned on, thus, the signal of the scan signal output end G(N) and the clock signal of the clock signal input end CK are identical and are high potentials. Thus, during the third time period P3, a change in the potential of the scan signal output end G(N) causes a voltage jump at one end of the bootstrap capacitor Cbt that is connected with the first node Q(N), therefore, the potential of the first node Q(N) is further pulled up. Although the signal of the upper-level scan signal output end G(N−1) is in a low potential during the third time period P3, which causes the second pull-down maintaining transistor Th to be in a turned-off state, at this time, the level transmission signal of the lower-level level transmission signal output end ST(N+1) and the scan signal of the lower-level scan signal output end G(N+1) are also in a low potential, and the first pull-down maintaining transistor T12 is in a turned-off state. Therefore, the potential of the pull-down maintaining signal output end H(N+1) may be maintained to be a low potential.

During the third period t3, the potential of the first node Q(N) and the potential of the upper-level first node Q(N−1) are both a low potential, the level transmission signal of the lower-level transmission signal output end ST(N+1) and the scan signal of the lower-level scan signal output end G(N+1) are firstly in a high potential, and the pull-down maintaining signal output end H(N+1) may be charged to a high potential. At this time, the first pull-down transistor T31 and the second pull-down transistor T41 may be turned on, and the present-level GOA circuit 200 outputs a low potential signal normally. Hereafter, the level transmission signal of the lower-level level transmission signal output end ST(N+1) and the scan signal of the lower-level scan signal output end G(N+1) may be in a low potential simultaneously, the pull-down maintaining signal output end H(N+1) may maintain in a high potential unchanged under the function of the pull-down maintaining capacitor Ch, the first pull-down transistor T31 and the second pull-down transistor T41 may be turned on, such that the potentials of the first node Q(N) and the scan signal output end G(N) are maintained at the first voltage of the first voltage input end VSS unchanged.

An inverter of a Darlington structure is not used in the pull-down maintaining unit of the single-level GOA circuit of the present application, but the same circuit function effect may be achieved, and a new concept and thinking are provided for GOA circuit designs.

According to exemplary embodiments of the present invention, the present invention may provide a display panel which includes a display region and a GOA circuit located on an edge of the display region, wherein the GOA circuit is similar to the GOA circuit and principles thereof in the above embodiments, and thus will not be repeated here.

According to exemplary embodiments of the present invention, the present invention may also provide a display device which may include the display panel in the above embodiments.

In conclusion, the present invention puts forward a new GOA circuit in which it is possible to avoid using an inverter of a Darlington structure while implementing the same circuit function effect, and provides a new concept and thinking for GOA circuit designs, and saves a space occupied by the GOA circuit to a large extend, thereby providing new possibilities for designs of a narrow-frame display panel.

Although some exemplary embodiments of the present invention have been presented and described, those skilled in the art should understand that the amendments can be made to these embodiments without departing from the principles and spirit of the present invention of which the scope is defined by the claims and their equivalents.

What is claimed is:

1. A GOA Circuit, the GOA circuit comprises GOA circuits of multiple levels that set by cascading, the GOA circuit pull-up unit, a signal downward transmission unit, a pull-down unit, a pull-down maintaining unit, and a bootstrap unit, the GOA circuit of each level is disposed with a clock signal input end, a first node, a first voltage input end, a pull-down maintaining signal output end and a scan signal output end outputting to a horizontal scan line, the first node being on a connection line between the pull-up control unit and the bootstrap unit, wherein the pull-down maintaining unit comprises a first pull-down maintaining transistor, a pull-down maintaining capacitor and a second pull-down maintaining transistor, a gate of the first pull-down maintaining transistor is connected to an output end of a lower-level signal downward transmission unit, and a source and a drain are respectively connected to a lower-level scan signal output end and a pull-down maintaining signal output end, the pull-down maintaining capacitor is connected between a drain of the first pull-down maintaining transistor and the first voltage input end, a gate of the second pull-down maintaining transistor is connected to an upper-level first node, and a source and a drain are respectively connected to the pull-down maintaining signal output end and the first voltage input end, and the pull-down unit pulls down a potential of the first node and a potential of the scan signal output end to a first voltage input to the first voltage input end based on a pull-down maintaining signal output from the pull-down maintaining signal output end.

2. The GOA circuit of claim 1, wherein a low level signal is input at the first voltage input end, clock signals of GOA circuits of two adjacent levels input at a clock signal input end are complementary with each other.

3. The GOA circuit of claim 1, wherein the pull-down unit comprises a first pull-down transistor and a second pull-down transistor, a gate of the first pull-down transistor and a gate of the second pull-down transistor are connected to the pull-down maintaining signal output end, a source of the first pull-down transistor and a source of the second pull-down transistor are respectively connected to the scan signal output end and the first node, and a drain of the first pull-down transistor and a drain of the second pull-down transistor are connected to the first voltage input end.

4. The GOA circuit of claim 1, wherein the pull-up control unit comprises a pull-up control transistor, a gate of the pull-up control transistor is connected to an output end of an upper-level signal downward transmission unit, a source is connected to an upper-level scan signal output end, and a drain is connected to the first node.

5. The GOA circuit of claim 4, wherein the signal downward transmission unit comprises a signal downward transmission transistor, a gate of the signal downward transmission transistor is connected to the first node, a source is connected to the clock signal input end, and a drain is connected to a gate of an upper-level first pull-down maintaining transistor and a gate of a lower-level pull-up control transistor.

6. The GOA circuit of claim 1, wherein the pull-up unit comprises a pull-up transistor, a gate of the pull-up transistor is connected to the first node, a source is connected to the clock signal input end, and a drain is connected to the scan signal output end.

7. The GOA circuit of claim 1, wherein the bootstrap unit comprises a bootstrap capacitor, and two ends of the bootstrap capacitor are respectively connected with the first node and the scan signal output end.

8. A display panel comprising a GOA circuit, wherein the GOA circuit comprises GOA circuits of multiple levels comprises a pull-up control unit, a pull-up unit, a signal downward transmission unit, a pull-down unit, a pull-down maintaining unit, and a bootstrap unit, the GOA circuit of each level is disposed with a clock signal input end, a first node, a first voltage input end, a pull-down maintaining signal output end and a scan signal output end outputting to a horizontal scan line, the first node being on a connection line between the pull-up control unit and the bootstrap unit, wherein the pull-down maintaining unit comprises a first pull-down maintaining transistor, a pull-down maintaining capacitor and a second pull-down maintaining transistor, a gate of the first pull-down maintaining transistor is connected to an output end of a lower-level signal downward transmission unit, and a source and a drain are respectively connected to a lower-level scan signal output end and a pull-down maintaining signal output end, the pull-down maintaining capacitor is connected between the drain of the first pull-down maintaining transistor and the first voltage input end, a gate of the second pull-down maintaining transistor is connected to an upper-level first node, and a source and a drain are respectively connected to the pull-down maintaining signal output end and the first voltage input end, and the pull-down unit pulls down a potential of the first node and a potential of the scan signal output end to a first voltage input to the first voltage input end based on a pull-down maintaining signal output from the pull-down maintaining signal output end.

9. The display panel of claim 8, wherein a low level signal is input at the first voltage input end, clock signals of GOA circuits of two adjacent levels input at a clock signal input end are complementary with each other.

10. The display panel of claim 8, wherein the pull-down unit comprises a first pull-down transistor and a second pull-down transistor, a gate of the first pull-down transistor and a gate of the second pull-down transistor are connected to the pull-down maintaining signal output end, a source of the first pull-down transistor and a source of the second pull-down transistor are respectively connected to the scan signal output end and the first node, and a drain of the first pull-down transistor and a drain of the second pull-down transistor are connected to the first voltage input end.

11. The display panel of claim 8, wherein the pull-up control unit comprises a pull-up control transistor, a gate of the pull-up control transistor is connected to an output end of an upper-level signal downward transmission unit, a source is connected to an upper-level scan signal output end, and a drain is connected to the first node.

12. The display panel of claim 11, wherein the signal downward transmission unit comprises a signal downward transmission transistor, a gate of the signal downward transmission transistor is connected to the first node, a source is connected to the clock signal input end, and a drain is connected to a gate of an upper-level first pull-down maintaining transistor and a gate of a lower-level pull-up control transistor.

13. The display panel of claim 8, wherein the pull-up unit comprises a pull-up transistor, a gate of the pull-up transistor is connected to the first node, a source is connected to the clock signal input end, and a drain is connected to the scan signal output end.

14. The display panel of claim 8, wherein the bootstrap unit comprises a bootstrap capacitor, and two ends of the bootstrap capacitor are respectively connected with the first node and the scan signal output end.

15. A display device comprising the display panel of claim 8.

* * * * *